US009326121B2

(12) United States Patent
Yang et al.

(10) Patent No.: US 9,326,121 B2
(45) Date of Patent: Apr. 26, 2016

(54) DEVICE DISCOVERY USING DISTRIBUTED RANDOM ACCESS FOR DEVICE TO DEVICE COMMUNICATION

(71) Applicants: MEDIATEK Singapore Pte. Ltd., Singapore (SG); National Taiwan University, Taipei (TW)

(72) Inventors: Zhu-Jun Yang, Changhua County (TW); Jie-Cheng Huang, Tainan (TW); Chun-Ting Chou, Taipei (TW); Hung-Yun Hsieh, Taipei (TW); Ping-Cheng Yeh, Taipei (TW); Chia-Chun Hsu, New Taipei (TW)

(73) Assignees: National Taiwan University, Taipei (TW); MEDIATEK Singapore Pte. Ltd., Singapore (SG)

( * ) Notice: Subject to any disclaimer, the term of this patent is extended or adjusted under 35 U.S.C. 154(b) by 197 days.

(21) Appl. No.: 14/161,924

(22) Filed: Jan. 23, 2014

(65) Prior Publication Data

US 2014/0204898 A1 Jul. 24, 2014

Related U.S. Application Data

(60) Provisional application No. 61/756,046, filed on Jan. 24, 2013.

(51) Int. Cl.
*H04W 40/24* (2009.01)
*H04W 72/04* (2009.01)
(Continued)

(52) U.S. Cl.
CPC .............. *H04W 8/005* (2013.01); *H04L 5/003* (2013.01); *H04L 5/0032* (2013.01); *H04L 5/0058* (2013.01); *H04W 48/12* (2013.01);
(Continued)

(58) Field of Classification Search
None
See application file for complete search history.

(56) References Cited

U.S. PATENT DOCUMENTS

2011/0317569 A1* 12/2011 Kneckt ............ H04W 74/0833
370/252
2012/0243431 A1  9/2012  Chen et al. .................... 370/252
(Continued)

FOREIGN PATENT DOCUMENTS

CN     101873704 A     4/2009
CN     102792745 A    12/2009
(Continued)

OTHER PUBLICATIONS

International Search Report and Written Opinion of International Search Authority for PCT/CN2014/071400 dated Apr. 30,2014 (12 pages).

(Continued)

*Primary Examiner* — Omar Ghowrwal
(74) *Attorney, Agent, or Firm* — Imperium Patent Works; Zheng Jin (57) ABSTRACT

A fast device discovery protocol with a high success rate for device-to-device (D2D) communication in LTE-A networks is proposed. With the proposed protocol, device discovery is done by monitoring a randomly transmitted beacon from other devices within a pre-defined period. In one embodiment, an eNB receives scheduling requests from D2D UEs and in response allocates a distributed uplink resource for random access of beacon transmission by the D2D UEs. The distributed resource is dynamically allocated based on the number of requesting D2D UEs, a discovery period, and a target discovery probability to minimize the required resource.

23 Claims, 7 Drawing Sheets

(51) Int. Cl.
    *H04W 8/00*     (2009.01)
    *H04L 5/00*     (2006.01)
    *H04W 52/02*     (2009.01)
    *H04W 48/12*     (2009.01)
    *H04W 72/12*     (2009.01)
    *H04W 74/08*     (2009.01)
    *H04W 92/18*     (2009.01)
    *H04W 48/16*     (2009.01)

(52) U.S. Cl.
    CPC ...... *H04W52/0216* (2013.01); *H04W 52/0219* (2013.01); *H04W 48/16* (2013.01); *H04W 72/042* (2013.01); *H04W 72/1284* (2013.01); *H04W 74/0833* (2013.01); *H04W 92/18* (2013.01)

(56) References Cited

U.S. PATENT DOCUMENTS

| | | | | |
|---|---|---|---|---|
| 2012/0265818 A1* | 10/2012 | Van Phan | .............. | H04W 48/12 709/204 |
| 2013/0148566 A1 | 6/2013 | Doppler et al. | .............. | 370/312 |
| 2013/0172036 A1* | 7/2013 | Miklos | .............. | H04W 8/005 455/517 |

FOREIGN PATENT DOCUMENTS

| | | |
|---|---|---|
| CN | 102547871 A1 | 2/2012 |
| WO | WO2012035367 A1 | 9/2010 |

OTHER PUBLICATIONS

On the Design of Device-to-Device Autonomous Discovery; IEEE Fourth International Conference; Baccelli et al.; Bangalore; Jan. 3-7, 2012 (9 pages).
3GPP TS 36.300 V10.9.0 (Dec. 2012) Technical Specification E-UTRA and E-UTRAN overall description Stage 2 (Release 10).
3GPP TS 25.401 V10.2.0 (Jun. 2011) Technical Specification UTRAN overall description (Release 10).
3GPP TS 25.308 V10.6.0 (Dec. 2011) Technical Specification HSDPA overall description Stage 2 (Release 10).
RP-122009—3GPP TSG RAN Meeting #58—Study on LTE Device to Device Proximity Services.
RP-120256—3GPP TSG RAN Meeting #55 Xiamenm, P.R. China, Feb. 28-Mar. 2, 2013—Revised WID for LTE RAN Enhancement for Diverse Data Applications.
RP-120256—3GPP TAG RAN Meeting #53 Fukuoka, Japan, Sep. 13-16, 2011—Revised WID for LTE RAN Enhancement for Diverse Data Applications.
The 3G4G Blog—Friday, Feb. 12, 2010—A quick Introduction to M2M Communications.
Vehicular ad hoc network—from Wikipedia Accessed Dec. 4, 2015.

* cited by examiner

D2D PEER DISCOVERY AND COMMUNICATION PROCEDURE

FIG. 3

DISTRIBUTED UPLINK RESOURCE FOR D2D DISCOVERY

FIG. 4

$$p_i = C_1^{k \times N} \left(\frac{1}{k \times N}\right)\left(1 - \frac{1}{k \times N}\right)^{m-1}$$

DISCOVERY PROBABILITY FOR CLIENT-SERVER SERVICE

FIG. 5

| P_DTARGET | 0.8 | | | | | | 0.95 | | | | | |
|---|---|---|---|---|---|---|---|---|---|---|---|---|
| m | 50 | 100 | 200 | 300 | 400 | 500 | 50 | 100 | 200 | 300 | 400 | 500 |
| k | 7 | 7 | 17 | 17 | 3 | 17 | 13 | 13 | 13 | 13 | 13 | 13 |
| N | 12 | 24 | 20 | 30 | 225 | 50 | 6 | 12 | 24 | 36 | 48 | 60 |
| t | 1200 | 600 | 720 | 480 | 64 | 288 | 1200 | 600 | 300 | 200 | 150 | 120 |
| R(%) | 0.02 | 0.05 | 0.09 | 0.14 | 0.19 | 0.24 | 0.04 | 0.09 | 0.17 | 0.26 | 0.35 | 0.43 |

MINIMIZED RESOURCE RATIO FOR CLIENT-SERVER SERVICE

FIG. 6

$$p_{i,j} = C_1^{k \times N} \left(\frac{1}{k \times N}\right) \left(\frac{k \times N - 1}{k \times N}\right) \left(1 - \frac{1}{k \times N}\right)^{m-2}$$

DISCOVERY PROBABILITY FOR PEER-TO-PEER SERVICE

FIG. 7

| P_DTARGET | 0.97 | | | | 0.99 | | | |
|---|---|---|---|---|---|---|---|---|
| m | 50 | 100 | 150 | 200 | 50 | 100 | 150 | 200 |
| k | 1 | 3 | 3 | 3 | 1 | 1 | 3 | 1 |
| N | 50 | 50 | 50 | 100 | 50 | 100 | 100 | 250 |
| t | 5 | 8 | 5 | 4 | 4 | 2 | 4 | 1 |
| R(%) | 0.8 | 1.5 | 2.4 | 3 | 1 | 2 | 3 | 4 |

MINIMIZED RESOURCE RATIO FOR PEER-TO-PEER SERVICE

METHOD OF D2D PEER DISCOVERY FROM ENB PERSPECTIVE

FIG. 11

METHOD OF D2D PEER DISCOVERY FROM UE PERSPECTIVE

FIG. 12

DEVICE DISCOVERY USING DISTRIBUTED RANDOM ACCESS FOR DEVICE TO DEVICE COMMUNICATION

CROSS REFERENCE TO RELATED APPLICATIONS

This application claims priority under 35 U.S.C. §119 from U.S. Provisional Application No. 61/756,046, entitled "Fast Device Discovery for Device to Device Communication," filed on Jan. 24, 2013, the subject matter of which is incorporated herein by reference.

TECHNICAL FIELD

The disclosed embodiments relate generally to device-to-device wireless communication systems, and, more particularly, to fast device discovery for device to device communication.

BACKGROUND

With the prevalence of mobile devices, the existing $3^{rd}$ generation (3G) and the 3.5 generation (3.5G) technologies no longer can support the continuous growth of wireless applications and services. Therefore, Long Term Evolution (LTE) was proposed by the $3^{rd}$ Generation Partnership Project (3GPP) as a new network standard to solve this problem. After the LTE Release 10, LTE was further improved as Long Term Evolution-Advanced (LTE-A), which is regarded as the $4^{th}$ generation (4G) standard. In LTE-A, new technologies including enhancements for diverse data applications (eDDA), multi-input multi-output (MIMO), carrier aggregation (CA), small cell and device-to-device (D2D) communication, are proposed to improve network capacity and efficiency.

Among these new technologies, D2D communication is considered as a key enabling technology to facilitate machine-to-machine (M2M) communication in LTE-A. In the future M2M communication, a sheer number of machines need to communicate with each other for diverse applications such as home or office automation, intelligent vehicles or transportation systems, or smart power monitoring. The resulting control and data traffic from these machines, if directly injected to the LTE network, will overwhelm the network and degrade the performance of existing human-to-human communications. With the help of LTE-A D2D communication, machines (i.e., user equipments (UEs) in LTE-A) in proximity can communicate directly and locally, and thus lessen their impact on the LTE infrastructure. In addition, machines themselves also benefit from D2D communication for shorter communication latency. Furthermore, higher data rates can be supported while less power is consumed due to better channel quality and shorter physical distance between machines in proximity.

D2D communication has been widely discussed in the 3GPP meetings. A study item "proximity-based services (ProSe)" is created on the 3GPP Technical Specification Group Service and System Aspects 1 (TSG-SA1) meeting #55, and several usage scenarios are identified. Although different scenarios have their own requirements, a common set of functionalities is always needed. For example, UEs in the proximity must be able to discover each other (i.e., peer discovery). In the existing LTE network, nearby eNB discovery is through synchronization signal (PSS/SSS), and UEs can only connect to them via the random access procedure on PRACH. Therefore, a new mechanism—possibly with the assistance from the eNB—is needed for peer discovery. Peer discovery is divided into two types depending on whether D2D UEs have an ongoing session or not. If D2D UEs do not have a session, UEs may need to broadcast signals to identify themselves, which can be regarded as beacons to let other UEs know their existence. Since UEs do discovery themselves, the influence on the core network is very little. This type of discoveries is more suitable for M2M. However, transmitting beacons is power consuming, which is a key concern for M2M, especially when UEs transmit beacons blindly.

FlashLinQ is a reservation-based peer discovery method which is not designed based on LTE-A. Devices using it need to be globally synchronized. The frequency bandwidth FlashLinQ uses is 5 MHz and one discovery repetition period is 8 seconds. Furthermore, resources are further divided into 3584 peer discovery resource IDs (PDRIDs) in one repetition. As a device enters the network, it senses the channel and chooses a PDRID with a low signal power for transmitting a beacon to avoid collisions. Then it listens for beacons in the rest of the repetition. The time that UEs transmit beacons in every repetition will shift differently based on different PDRIDs they choose. The purpose is to avoid the case that two half-duplex UEs always transmit at the same time and cannot discover each other.

Although FlashLinQ claims that a device can discover about one thousand devices in ten seconds, there are still some salient problems. First, since every device has to reserve a dedicated PDRID for itself, the free PDRIDs in different places are different. If two faraway devices choose the same PDRID, once they are close there is a collision. Although devices can detect collisions and reselect other PDRIDs, the probability they choose the same PDRID again is still high. Because they sense the same region, the optimal free PDRID they sensed is the same. Therefore, collisions in the case that devices have mobility will be too much for devices to deal with. The efficiency for discovery is thus low. Second, when a device enters the network, the waiting time for sensing the channel is long. This might cause collisions too. The probability that at least two nearby device is turned on for the discovery in one repetition is not low. After sensing, they may choose the same optimal free PDRID with very high probability and cause collisions.

A solution is sought on peer discovery for D2D communication in LTE-A networks.

SUMMARY

A method of device discovery for device-to-device (D2D) communication in LTE-A networks is proposed. A new distributed random access protocol is proposed for UEs to broadcast their presence. A mathematical model is also developed so that eNBs can dynamically adjust its resource allocation for device discovery, based on the number of requesting D2D UEs. As a result, eNBs can minimize the required resource while achieving the target discovery probability. Because of its scalability and mobility support, the proposed protocol will enable various M2M applications in LTE-A networks.

In one novel aspect, UEs randomly choose one resource block (RB) for transmitting a beacon in a specific beacon period and do it again and again in the following repetitions. Therefore, once there is a collision, the amount UEs can reselect in the whole RBs in one beacon period. As compared with FlashLinQ, the probability that UEs collide again and again is very low. UEs also do not need to detect collisions since every repetition has a new beginning. Furthermore, the waiting time for UEs after joining the network is very low. An eNB allocates resource immediately after each UE requests and UEs do not have to waste efforts on sensing the channel. To further increase successful beacon transmission, the settings for beacon transmissions can be adjusted by the network based on different situations to increase the successful probability as high as possible.

In one embodiment, an eNB receives scheduling requests from D2D UEs and in response allocates a distributed uplink resource for random access of beacon transmission by the D2D UEs. The distributed resource contains k RBs in every t time slots, and one beacon period includes N times t time slots. A UE randomly selects one RB for beacon transmission during one beacon period. If the discovery fails, then the UE randomly selects another RB for beacon transmission in the next beacon period, and so on so forth, until the UE is discovered by another UE. The eNB dynamically allocates the distributed resource (e.g., selecting k, t, and N) based on the number of requesting D2D UEs, a discovery period, and a target discovery probability to minimize the required resource. In one example, a very high discovery probability of 0.99% can be achieved in one second for 50 D2D UEs using only 1% of the uplink resource.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
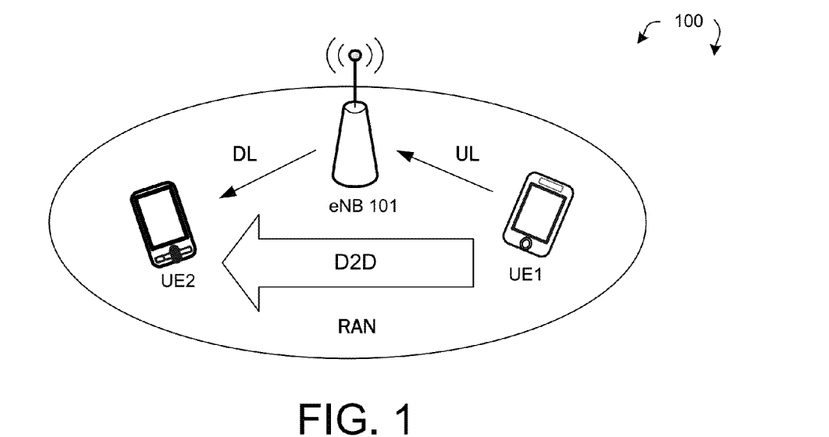
FIG. 1 illustrates an LTE-A network with D2D communication in accordance with one novel aspect.

FIG. 1 illustrates a wireless LTE-A communication network 100 with device-to-device (D2D) communication in accordance with one novel aspect. Wireless communication network 100 comprises a base station eNB 101, a first D2D user equipment UE1, and a second D2D user equipment UE2. Both UE1 and UE2 can communicate by sending uplink data to eNB 101, or receiving downlink data from eNB 101. D2D communication is proposed to improve network capacity and efficiency in LTE-A, because D2D UEs in the proximity of each other can communicate directly and locally. For example, UE1 and UE2 can communicate with each other directly after initial discovery and session setup. However, to support D2D communication in LTE-A, all relevant mechanisms, protocols, and signal formats must be developed under the framework of the existing LTE-A architecture. For example, eNB 101 should be in control of all radio resources and UE1 and UE2 are not allowed to transmit any message without the permission of eNB 101. Therefore, to initiate discovery of devices for D2D communications, each D2D UE must send a D2D scheduling request, and in response receiving an uplink grant from the network of allocated uplink resource.

In one novel aspect, a fast discovery protocol with high success rate in the LTE-A network is proposed. With the proposed protocol, device discovery is performed by monitoring a randomly transmitted beacon from other devices within a pre-defined beacon period. In one embodiment, UE1/UE2 first sends D2D scheduling requests to eNB 101. Upon receiving the scheduling requests, eNB 101 determines a distributed resource to be allocated to UE1/UE2 for beacon transmission. UE1/UE2 then randomly selects a resource block (RB) from the distributed resource for beacon transmission during a predefined beacon period. The distributed resource is dynamically determined based on D2D parameters such as total number of devices, discovery period, target discovery probability, etc. to substantially minimize the required resource.

Figure 2:
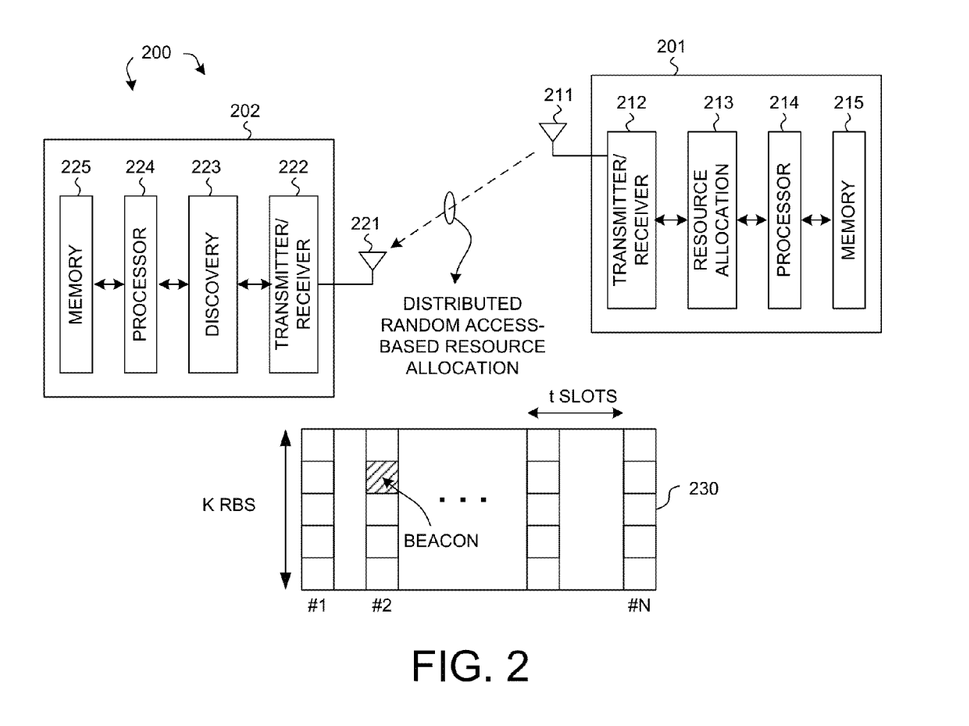
FIG. 2 illustrates simplified block diagrams of an eNB and a UE for D2D peer discovery in accordance with one novel aspect.

FIG. 2 illustrates simplified block diagrams of an eNB 201 and a UE 202 for D2D peer discovery in accordance with one novel aspect. Base station eNB 201 has RF transceiver module 212, coupled with antenna 211, receives RF signals from antenna 211, converts them to baseband signals and sends them to processor 214. RF transceiver 212 also converts received baseband signals from the processor 214, converts them to RF signals, and sends out to antenna 211. Processor 214 processes the received baseband signals and invokes different functional modules to perform features in the eNB. Memory 215 stores program instructions and data to control the operations of the eNB. Similarly, UE 202 has RF transceiver module 222, coupled with antenna 221, receives RF signals from antenna 221, converts them to baseband signals and sends them to processor 224. RF transceiver 222 also converts received baseband signals from the processor 224, converts them to RF signals, and sends out to antenna 221. Processor 224 processes the received baseband signals and invokes different functional modules to perform features in the UE. Memory 225 stores program instructions and data to control the operations of the UE.

The functional modules may be implemented by hardware, firmware, software, or any combination thereof. The function modules, when executed by processors 214 and 224 (e.g., via executing program codes in memory 215 and 225, respectively), allow eNB 201 to allocate uplink resource for UE 202 to initiate peer discovery for the purpose of D2D communication. In the example of FIG. 2, the discovery module 223 in UE 202 initiates a device discovery procedure by sending a D2D scheduling request (SR) to eNB 201, and the resource allocation module 213 in eNB 201 allocates a distributed resource to UE 202 for beacon transmission. The distributed resource, as depicted by box 230 of FIG. 2, contains k resource blocks (RBs) in every t time slots, and in each of the N slots during one beacon period. For each beacon transmission, UE 202 randomly selects one RB from the k times N RBs during one beacon period. UE 202 may repeat such random access for beacon transmission until it is successfully discovered by its peer D2D devices.

Figure 3:
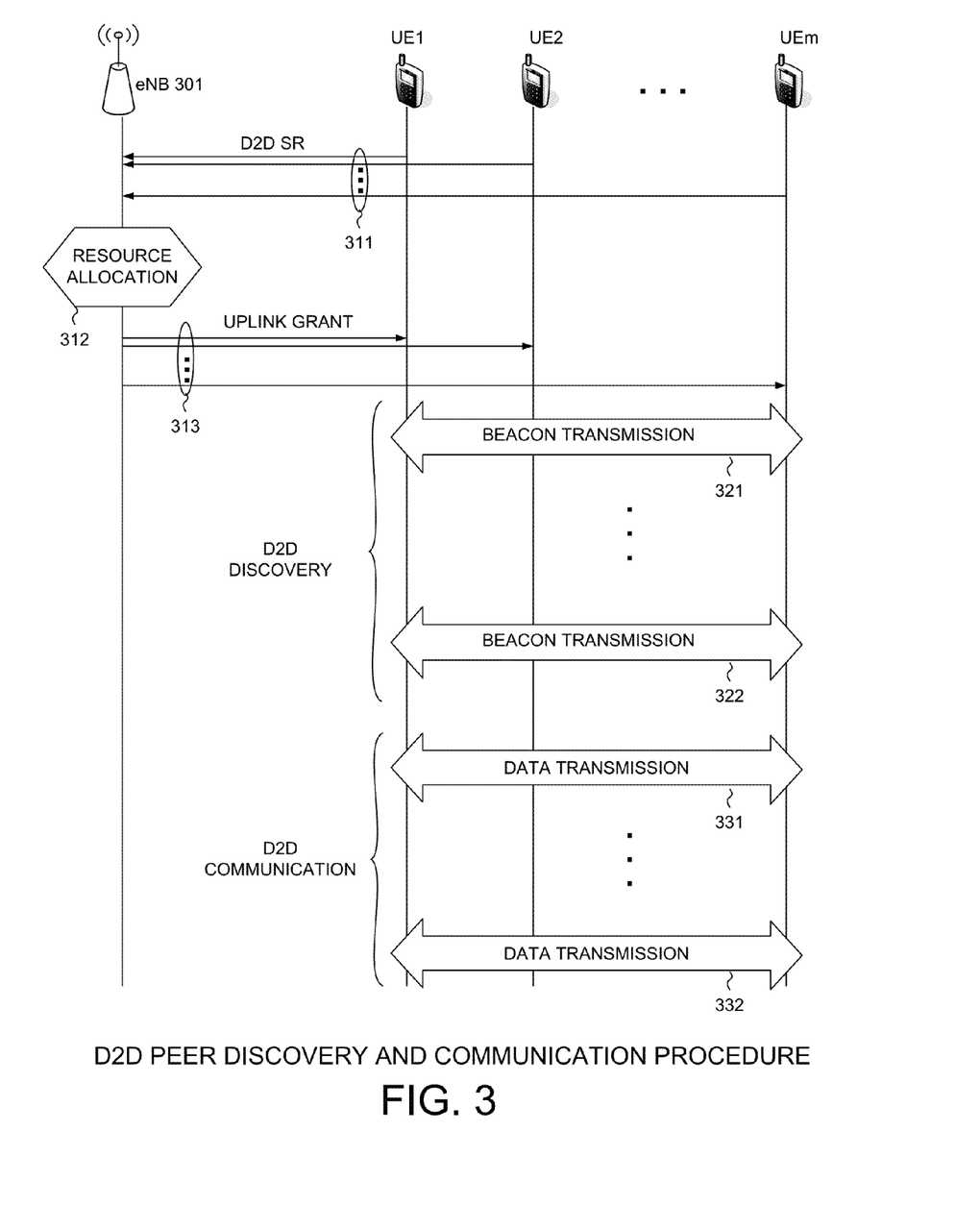
FIG. 3 illustrates a procedure of D2D communication in an LTE-A network in accordance with one novel aspect.

FIG. 3 illustrates a D2D communication procedure in an LTE-A network in accordance with one novel aspect. In step 311, eNB 301 receives a plurality of D2D scheduling requests (SRs) from a plurality of D2D UEs UE1, UE2 . . . UEm for beacon transmission to initiate D2D discovery. The D2D SRs may be transmitted on a random access channel (RACH) following similar procedures as specified in the LTE specification, with some additional information to indicate D2D beacon transmission. For example, the D2D SRs may also include D2D discovery parameters such as a discovery period, and a target discovery probability. Based on the SRs, eNB 301 determines uplink resource allocation for D2D discovery. For example, the uplink resource may be determined based on a total number of D2D UEs that requires beacon transmission, the discovery period, and the target discovery probability. The allocated uplink resource is distributed in such a way that minimum resource is required to satisfy the same D2D discovery performance. After eNB 301 allocates the uplink resource for beacon transmission, the UEs starts the D2D peer discovery by transmitting and receiving beacons (step 321-322). During one predefined beacon period, one beacon is transmitted by one D2D UE and no feedback is required from the receiving UE. Each D2D UE may repeat the beacon transmission for multiple beacon periods until it is successfully discovered by other D2D UEs, or stopped by a higher layer, or reaches a maximum transmission number. For example, when UE1 receives a beacon from another UE2, UE1 detects that UE2 is in its proximity and can reply to UE2 and establish a session with UE2 by the help of eNB 301. Finally, in step 331-332, the UEs starts D2D communication with each other directly.

Figure 4:
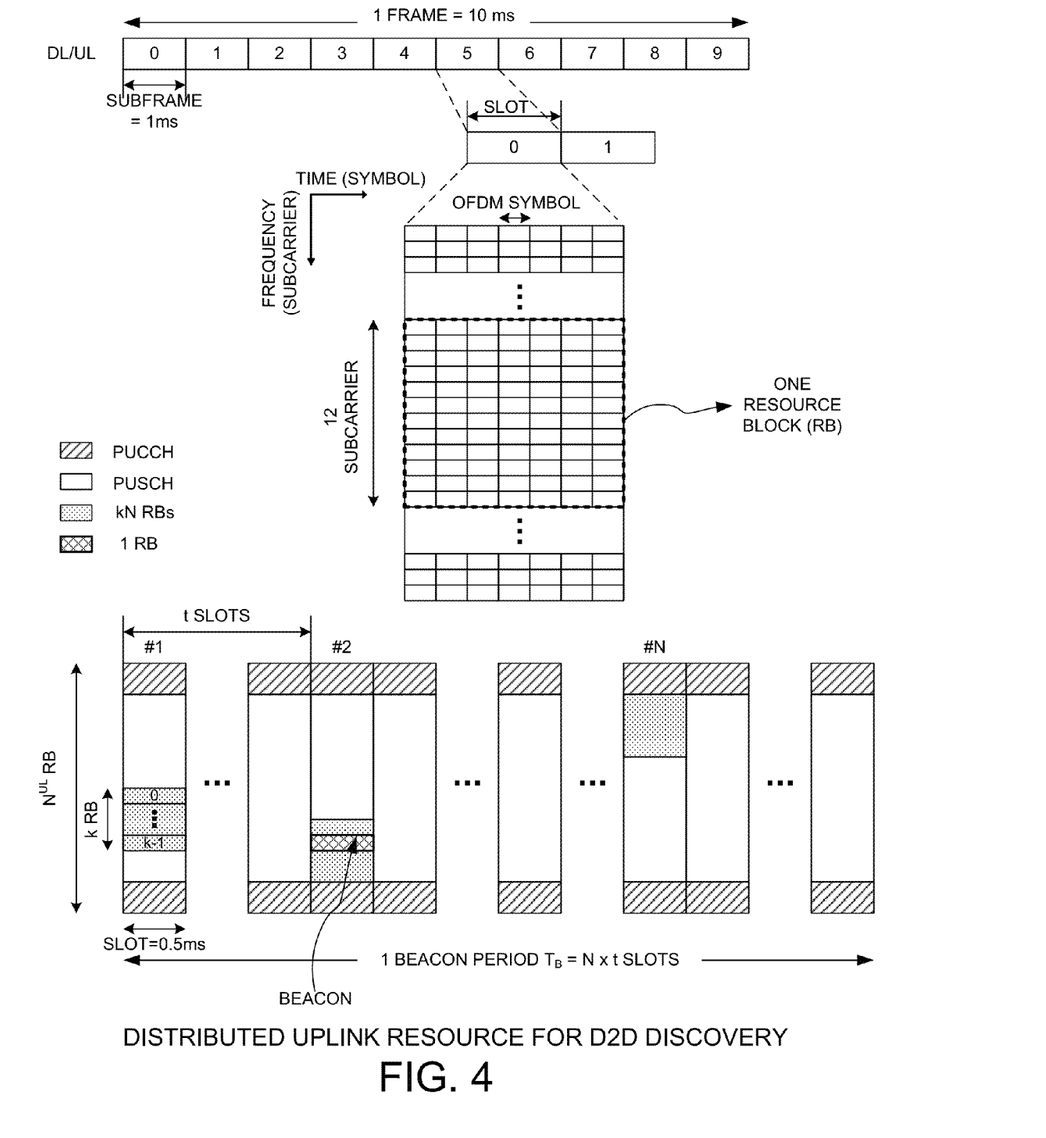
FIG. 4 illustrates a distributed uplink resource allocation for D2D peer discovery in accordance with one novel aspect.

FIG. 4 illustrates a distributed uplink resource allocation for D2D peer discovery in accordance with one novel aspect. In LTE-A, time division duplex (TDD) and frequency division duplex (FDD) are both supported. In either TDD or FDD, transmission is further divided into downlink DL, i.e., from eNBs to UEs, and uplink UL, which is from UEs to eNBs. Time of DL and UL is divided into 10-millisecond frames. As FIG. 4 shows, a frame consists of 10 subframes for DL and 10 subframes for UL. Each subframe is further divided into two slots. Every slot contains seven OFDM symbols in time domain and is split into several RBs in frequency domain. A resource block (RB) consists of 12 15-kHz subcarriers and is the basic resource allocation unit for data transmission in LTE-A. The amount of RBs in each cell depends on the size of the frequency band. Take a 5-MHz cell as an example. There are 25 RBs in one slot. The payload size in each slot depends on the MCS that eNB assigns. If QPSK and ½-code-rate are used, then the size of each RB transmission is 84 bits if multiple-input multiple-output (MIMO) and carrier aggregation techniques are not considered. In the following discussion, FDD is used as an example for peer discovery, while TDD is also applicable. In addition, the discovery signal is transmitted on the data channel, a physical uplink shared channel (PUSCH), of UL subframes. Alternatively, the discovery signal may also be transmitted on a physical random access channel (PRACH).

In LTE-A, both semi-persistent scheduling (SPS) and per-transmission-time-interval (per-TTI) scheduling are supported. When per-TTI scheduling is used, eNBs schedule each transmission for each UE dynamically. In most cases, per-TTI scheduling is used since eNBs can assign resource based on the report of channel quality indicator (CQI) in each subframe. Although per-TTI scheduling is for burst data transmissions, it is less applicable for real time streaming applications such as voice calls. Since the data rate of these applications is very low while at regular intervals, the overhead of the scheduling messages is very high. On the other hand, when semi-persistent scheduling is used, a semi-persistent transmission pattern is for the stream, instead of scheduling for single transmission. When an eNB determines to configure a UE with UL semi-persistent resource, it schedules the UL grant with the UE's Semi-Persistent Scheduling C-RNTI. This significantly reduces the scheduling overhead.

In accordance with one novel aspect, upon receiving D2D SRs, the eNB allocates a semi-persistent resource for all requesting UEs to reduce the signaling overheads in per-TTI scheduling. As FIG. 4 shows, the eNB allocates k RBs in every t slots. There are N allocated slots in each beacon period $T_B$, where $T_B = N \times t$. That is, in one $T_B$, there are (k×N) RBs for all requesting UEs to transmit beacons. To increase the frequency diversity of beacon transmissions, the scheduled RBs need to hop on frequency domain. First, the eNB sets frequency hopping (FH) flag as 1 in downlink control information (DCI) format 0 and resource allocation header as 0 (UL resource allocation type 0). Second, the eNB sets the PUSCH hopping type as type 2 (pseudo-random hopping between sub-bands). Finally, the eNB informs UEs of the scheduled RBs.

After receiving UL grant for beacon transmission, in every beacon period TB, each UE randomly selects one of the (k×N) scheduled RBs to transmit its beacon. Therefore, only one beacon is transmitted by each UE in every beacon period. Since no carrier sensing or collision detection mechanism is utilized, collisions could happen during beacon transmissions. The successful rate of beacon transmission thus depends on the number of UEs competing for the beacon resource in a cell (m), the amount of resource for beacon transmissions in a beacon period (k×N), and the length of one beacon period $T_B = (N \times t)$. Therefore, with sufficient resource, the successful rate can be increased. However, increasing of the required resource (k×N) is not allowed especially in a cell with hundreds of machines connected to the eNB. Instead, the required resource ratio R should be as low as possible. The resource ratio R may be represented by the following equation:

$$R = \frac{1}{t} \times \frac{k}{N_{RB}^{UL}} (\%), \quad (1)$$

where $N_{RB}^{UL}$ is the total amount of UL RBs in each slot of the cell. Therefore, there exists a tradeoff between the successful discovery rate and the required resource ratio for D2D peer discovery.

In general, the goal is to ensure that two UEs can discover each other as quick as possible while keeping the required resource as few as possible. As a result, the performance metrics of the successful discovery rate and the required resource ratio are both considered. The purpose of the evaluation is to find the best setting under different usage scenarios and different number of D2D UEs. It should be noted that the target of different usage scenarios are different. In one example, in M2M location-based services (LBS), machines such as smart parking meters broadcast their presence. Since only parking meters transmit messages to devices in cars, this kind of services is classified as client-server based services. The amount of parking spaces in one parking lot is usually very large, so the allocated resource must be sufficient to support the beacon transmissions of parking meters. In another example, in vehicular ad-hoc network (VANET), sensors in cars detect sensors in nearby cars. All sensors can transmit messages to and can receive messages from any other sensors, so these services are classified as peer-to-peer services. The successful rate of beacon transmission must be high and the discovery time must be short so that the driver can take action to avoid accidents.

Figure 5:
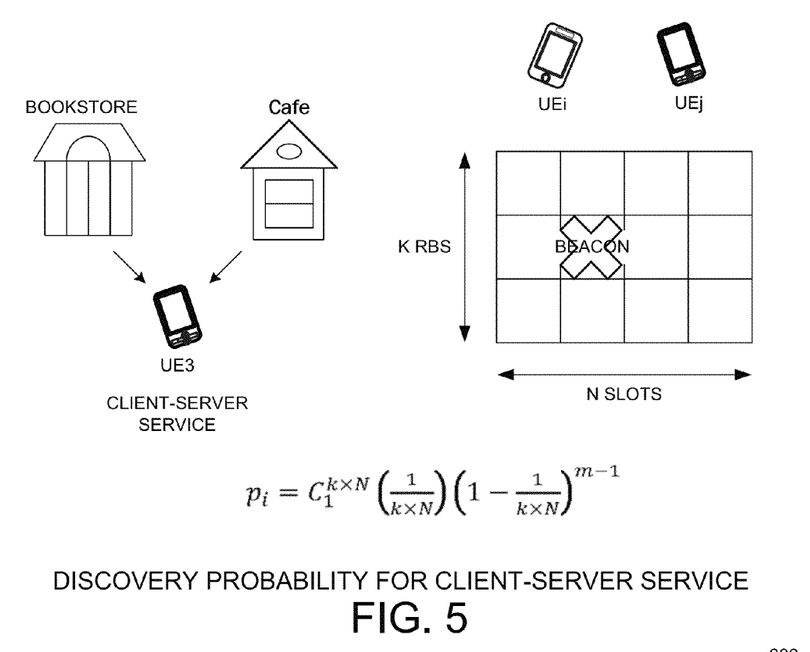
FIG. 5 illustrates a mathematic model of D2D peer discovery probability for client-server service.

FIG. 5 illustrates a mathematic model of D2D peer discovery probability for client-server service. In client-server service, there is m server UEs (e.g., the Bookstore or the Café) that transmit messages to other UEs (e.g., UE3). When there is only one UE transmits beacon on a specific RB, then the beacon transmission is regarded as successful. For every server UEi (i=1, 2 . . . m), the probability $p_i$ of successful beacon transmission in one beacon period of $T_B$ slots is:

$$p_i = C_1^{k \times N} \left( \frac{1}{k \times N} \right) \left( 1 - \frac{1}{k \times N} \right)^{m-1} \quad (2)$$

Therefore, if the discovery period is $T_D$ slots, then in $T_D$ slots, for UEi, the successful rate $P_D$, i.e., the probability of at least one successful beacon transmission, can be represented by:

$$P_D = 1 - (1-p)^{\lfloor \frac{T_D}{T_B} \rfloor} = 1 - (1-p)^{\lfloor \frac{T_D}{N \cdot t} \rfloor} \quad (3)$$

To derive the optimal setting for minimizing resource ratio R with a target discovery probability $P_{D\text{-}TAGET}$, t can be derived as:

$$t = \frac{T_D \times \ln\left(1 - \left(1 - \frac{1}{k \times N}\right)^{m-1}\right)}{N \times \ln(1 - P_{D,Target})}$$

Based on t, R can be rewritten as:

$$R = \frac{\ln(1 - P_{D,Target})}{T_D \times N_{RB}^{UL}} \times \frac{k \times N}{\ln\left(1 - \left(1 - \frac{1}{k \times N}\right)^{m-1}\right)}$$

By substituting x=(k×N), with a given set of m, $T_D$, $N_{RB}^{UL}$, and $P_{D\text{-}TAGET}$, the optimal setting of (k, N, t) can be derived by the following equations:

$$\begin{cases} N \times k = \lceil x_{min} \rceil, \lceil x_{min} \rceil \pm 1, \lceil x_{min} \rceil \pm 2, \ldots \\ t \leq \frac{T_D \times \ln\left(1 - \left(1 - \frac{1}{k \times N}\right)^{m-1}\right)}{N \times \ln(1 - P_{D,Target})} \\ modulo(T_D, N \times t) = 0 \end{cases}$$

Figure 6:
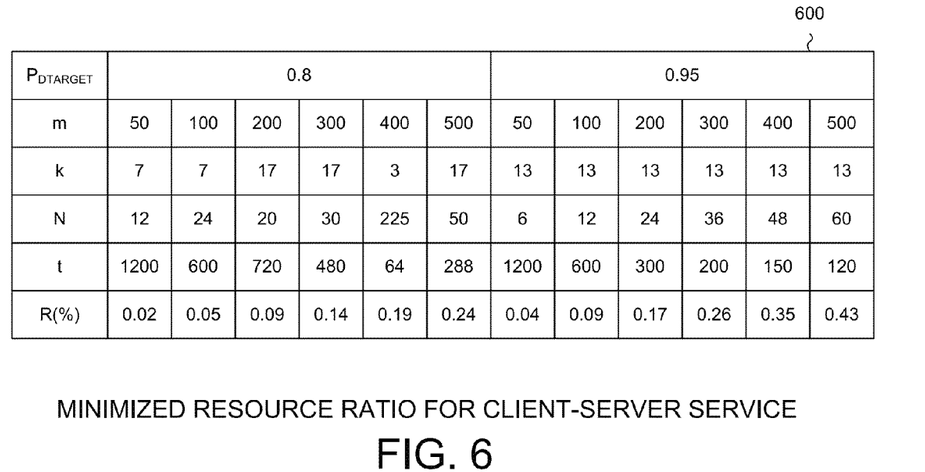
FIG. 6 illustrates optimized resource allocation for D2D peer discovery for client-server service.

FIG. 6 illustrates optimized resource allocation for D2D peer discovery for client-server service. In the example of FIG. 6, a D2D server device has a transmission range of Radius=10 m, and a D2D client device has a moving rate of 5 km per hour (e.g., walking). As a result, the discovery period $T_D$ can be calculated as $T_D$=14.4 seconds. Also assume that $N_{RB}^{UL}$=25 uplink resource in a 5 MHz cell. In table 600 of FIG. 6, different target discovery probabilities and different numbers of server UEs m are considered for calculating the optimal settings of (k, N, t) in minimizing resource ratio R. For example, two target discovery probabilities $P_{D\text{-}TAGET}$=0.8 and 0.95 are listed, and six different numbers of server UEs m=50, 100, 200, 300, 400, and 500 are also listed.

Figure 7:
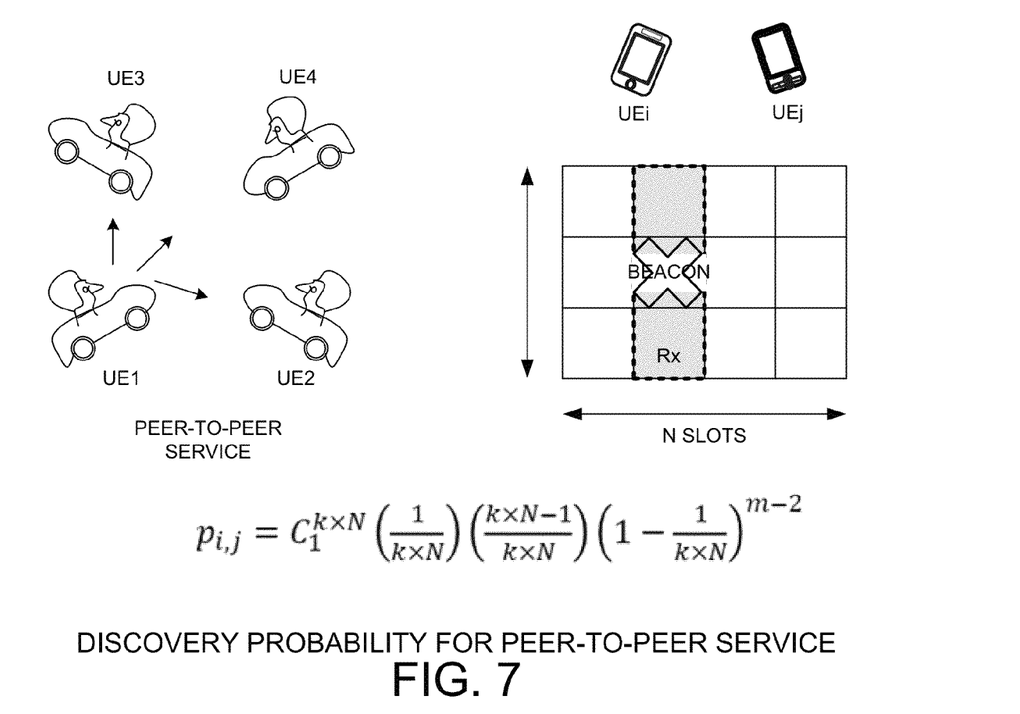
FIG. 7 illustrates a mathematic model of D2D peer discovery probability for peer-to-peer service.

FIG. 7 illustrates a mathematic model of D2D peer discovery probability for peer-to-peer service. In peer-to-peer services, each UE (e.g., UE1-UE4) discovers and is discovered by other UEs. Thus, the UEs transmit beacons and also receive beacons. Note that there exists half-duplex problem. If two UEs transmit beacons at the same time, then they cannot discover each other even if they transmit beacons on different RBs. Namely, considering the beacon resource allocated as FIG. 4, if UEj receives the beacon of UEi, it represents that all other (m−2) UEs cannot select the same RB with UEi. In addition, UEj must select a RB on different slots. The amount of RBs that UEj can choose is k×N−k. As a result, the probability $p_{i,j}$ that UEj (j=1, 2, . . . , m) discovers UEi (i=1, 2, . . . , m≠i) in one beacon period of $T_B$ slots is:

$$p_{i,j} = C_1^{k \times N} \left( \frac{1}{k \times N} \right) \left( \frac{k \times N - 1}{k \times N} \right) \left( 1 - \frac{1}{k \times N} \right)^{m-2} \quad (4)$$

Therefore, if the discovery period is $T_D$ slots, then in $T_D$ slots, the probability that UEj (j=1, 2, . . . , m) discovers UEi (i=1, 2, . . . , m,j≠i) is:

$$P_D = 1 - (1-p)^{\lfloor \frac{T_D}{T_B} \rfloor} = 1 - (1-p)^{\lfloor \frac{T_D}{N \cdot t} \rfloor} \quad (5)$$

The optimal settings can be derived by the same means for client-server service.

Figure 8:
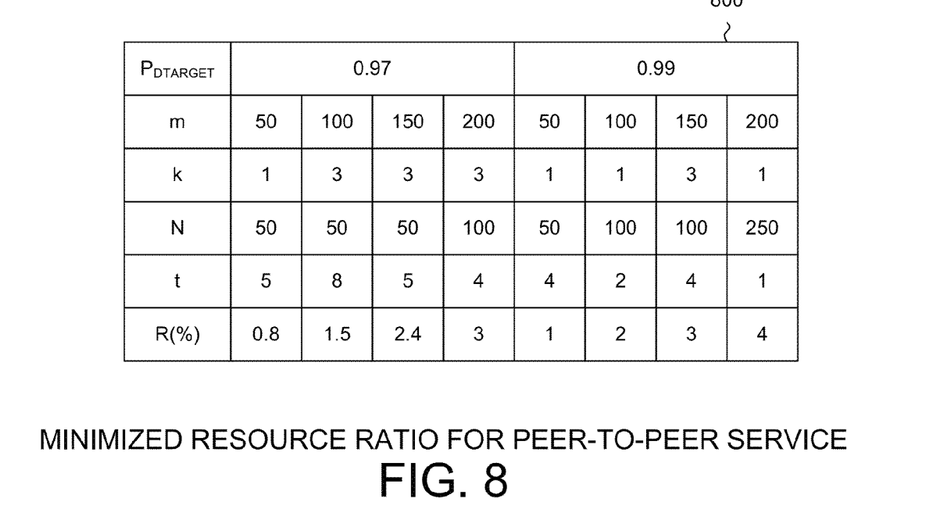
FIG. 8 illustrates optimized resource allocation for D2D peer discovery for peer-to-peer service.

FIG. 8 illustrates optimized resource allocation for D2D peer discovery for peer-to-peer service. In the example of FIG. 8, the case of discovery period $T_D$=1 second is considered, and that $N_{RB}^{UL}$=25 uplink resource in a 5 MHz cell. In table 800 of FIG. 8, different target discovery probabilities and different numbers of server UEs m are considered for calculating the optimal settings of (k, N, t) in minimizing resource ratio R. For example, two target discovery probabilities $P_{D\text{-}TAGET}$=0.97 and 0.99 are listed, and four different numbers of UEs m=50, 100, 150, and 200 are also listed. It should be noted that there exists half-duplex problem. As a result, the increasing of k might not increase the successful rate distinctly. Therefore, the parameter t is decreased to increase the successful rate. In the example of FIG. 8, it can be seen that a very high discovery probability of 0.99% can be achieved in one second for 50 D2D UEs using only 1% of the uplink resource.

Figure 9:
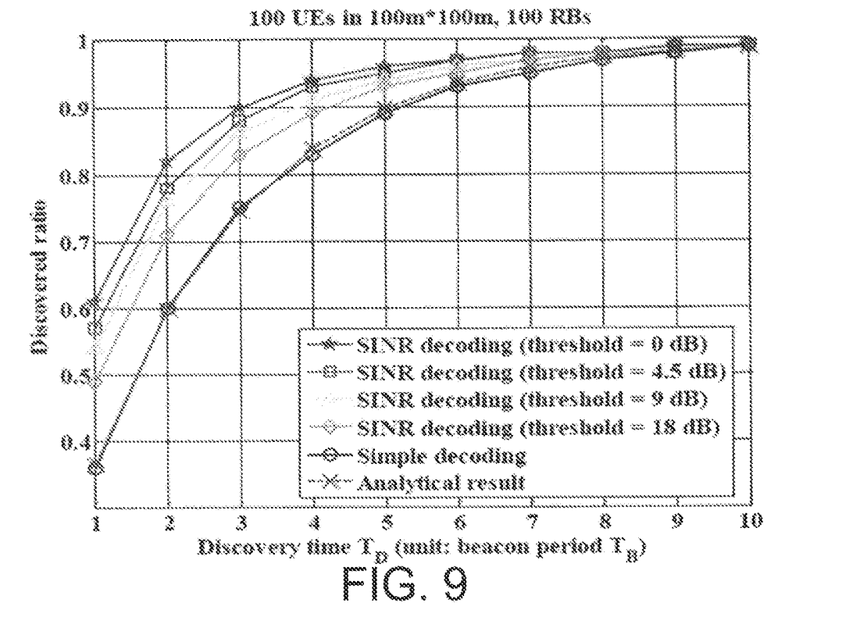
FIG. 9 illustrates a simulation result of discovery performance of the proposed method with different SINR decoding.

FIG. 9 illustrates a simulation result of discovery performance of the proposed method with different SINR decoding. In the example of FIG. 9, peer-to-peer service is considered. One hundred UEs (m=100) are randomly distributed in an area of 100×100 m². The Maximum UE speed is 0.8 m/s, and the transmission power is 23 dBm. The pathloss model is 135.5+40.0 log(d) dB, where d is the distance in kilometer. All UEs are assumed to start the discovery simultaneously. FIG. 9 depicts several performance curves of discovery ratio vs. discovery time in such environment. For analytical result, no SINR decoding is used, meaning that a UE listening to an RB cannot decode any colliding beacons. On the other hand, with SINR decoding, a UE listening in an RB is able to detect the beacon from a set of colliding beacons if the received SINR is above a designated threshold. The lower the threshold, the higher the performance will be.

Figure 10:
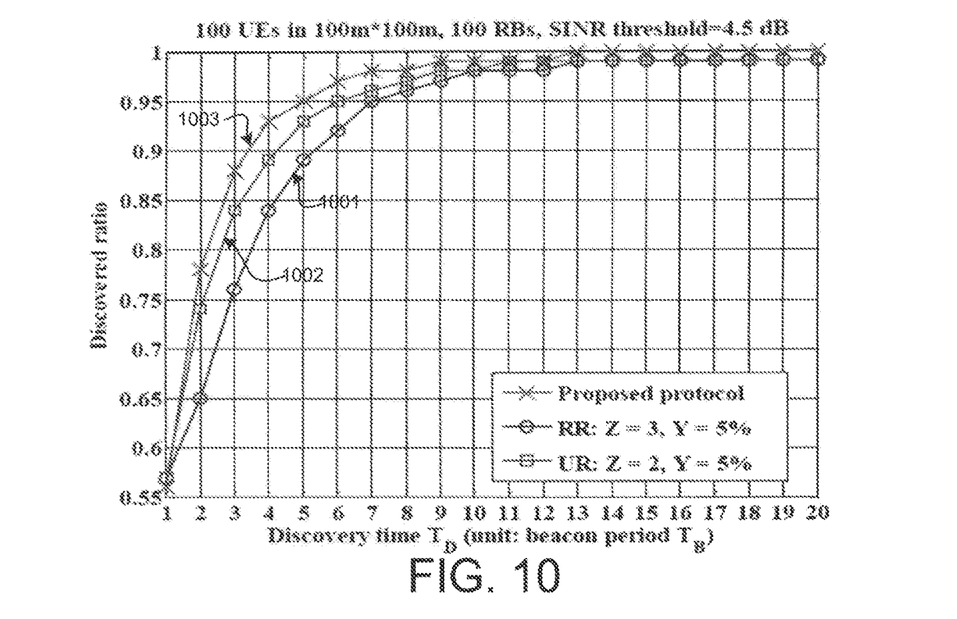
FIG. 10 illustrates a simulation result of discovery performance of the proposed method as compared with the Flash-LinQ method.

FIG. 10 illustrates a simulation result of discovery performance of the proposed method as compared with the FlashLinQ method. FIG. 10 shows three discovery performance curves. Curve 1001 depicts the performance of the reactive reselection (RR) method of FlashLinQ, curve 1002 depicts the performance of the unconditional reselection (UR) method of FlashLinQ, and curve 1003 depicts the performance of the proposed method. It can be seen that the proposed method outperforms both the FlashLinQ sensing methods. This is because the proposed D2D discovery protocol allows each UE to randomly select different RBs without sensing overhead. In addition, local collisions are reduced and less power consumption on sensing is achieved.

Figure 11:
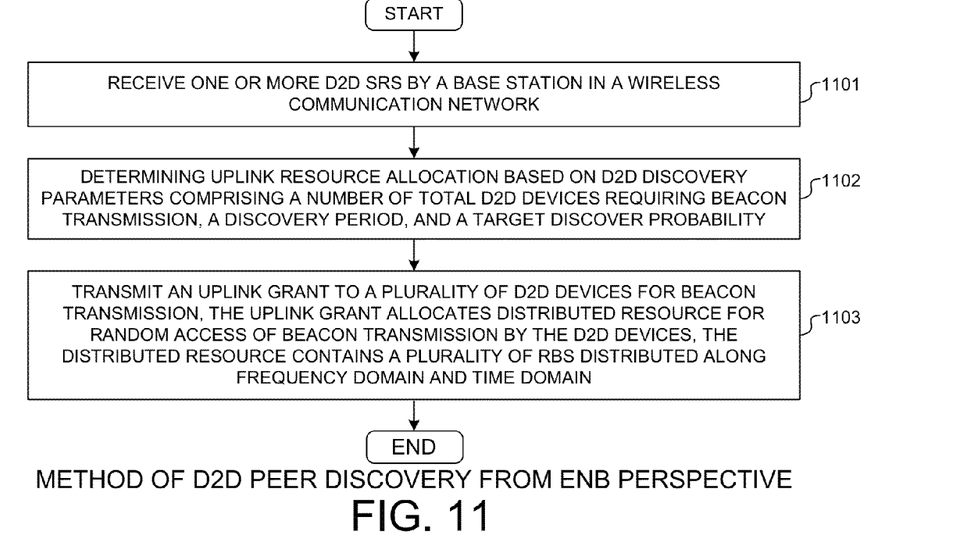
FIG. 11 is a flow chart of a method of D2D peer discovery from eNB perspective in accordance with one novel aspect.

FIG. 11 is a flow chart of a method of D2D peer discovery from eNB perspective in accordance with one novel aspect. In step 1101, a base station receives one or more D2D scheduling requests (SRs) in a wireless communication network. In step 1102, the base stations obtains D2D discovery parameters and thereby determining uplink resource allocation accordingly. The D2D discovery information includes a number of total D2D devices that require beacon transmission, a discovery period, and a target discovery probability. In step 1103, the base station transmits an uplink grant to a plurality of D2D devices for beacon transmission. The uplink grant allocates a distributed resource for random access of beacon transmission by the D2D devices. The distributed resource contains a plurality of resource blocks (RBs) distributed along frequency domain of subcarriers and time domain of time slots. In one embodiment, the distributed resource contains k RBs in every t slots. During one beacon period of (N×t) time slots, (k×N) RBs are allocated, and a D2D device randomly selects one RB from the allocated (k×N) RBs for one beacon transmission. The values of k, t, N are dynamically determined by the base station to substantially minimize the required resource under the same D2D discovery parameters.

Figure 12:
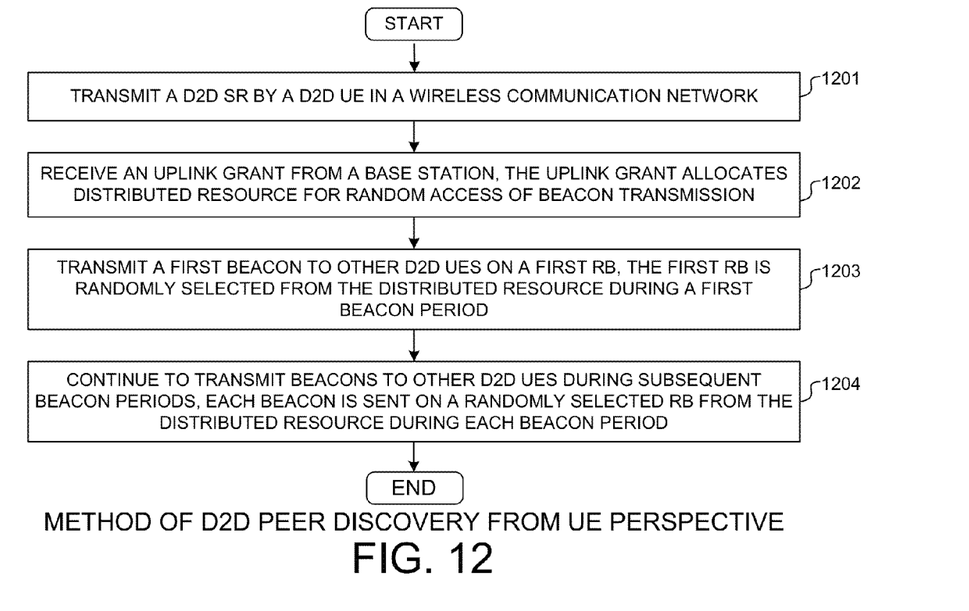
FIG. 12 is a flow chart of a method of D2D peer discovery from UE perspective in accordance with one novel aspect.

FIG. 12 is a flow chart of a method of D2D peer discovery from UE perspective in accordance with one novel aspect. In step 1201, a D2D UE transmits a D2D scheduling request (SR) to a base station in a wireless communication network. In step 1202, the UE receives an uplink grant from the base station. The uplink grants allocates a distributed resource for random access of beacon transmission. In step 1203, the UE transmits a first beacon to other D2D UEs on a first RB, the first RB is randomly selected from the distributed resource during a first beacon period. In step 1204, the UE continues to transmit beacons to other D2D UEs on RBs during subsequent beacon periods. Each beacon is sent on a randomly selected RB from the distributed resource during each beacon period. The UE continues the beacon transmission for D2D discovery until it is stopped by a higher layer, receives a reply from other D2D UEs, or reaches a maximum transmission number. In one embodiment, the distributed resource contains k resource blocks (RBs) in every t time slots. During one beacon period of (N×t) time slots, (k×N) RBs are allocated, and a D2D UE randomly selects one RB from the allocated (k×N) RBs for one beacon transmission. The values of k, t, N are dynamically determined by the base station to substantially minimize the required resource under the same D2D discovery parameters.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   receiving one or more device-to-device (D2D) scheduling requests (SR) by a base station (eNB) in a wireless communication network;
   determining uplink resource allocation based on D2D discovery parameters comprising a number of total D2D devices requiring beacon transmission, a discovery period, and a target discovery probability; and
   transmitting an uplink grant to a plurality of D2D devices for beacon transmission, wherein the uplink grant allocates a distributed resource for random access of beacon transmission by the D2D devices, and wherein the distributed resource contains a plurality of resource blocks (RBs) distributed along frequency domain of subcarriers and time domain of time slots.

2. The method of claim 1, wherein the distributed resource contains k resource blocks (RBs) in every t time slots, and wherein k and t are positive integers.

3. The method of claim 2, wherein the k RBs are allocated using a predefined frequency hopping scheme to achieve frequency diversity.

4. The method of claim 2, wherein k and t of the distributed resource are dynamically determined to substantially minimize required resource under the same D2D discovery parameters.

5. The method of claim 1, wherein one beacon period comprises N times t time slots for one beacon transmission by one device, and where N is a positive integer.

6. The method of claim 1, wherein the distributed resource is semi persistently allocated on a physical uplink shared channel (PUSCH) or a physical random access channel (PRACH).

7. The method of claim 1, wherein the base station obtains at least part of the D2D discovery parameters from the one or more scheduling requests.

8. A method, comprising:
   transmitting a device-to-device (D2D) scheduling request (SR) by a D2D user equipment (UE) in a wireless communication network;
   receiving an uplink grant from a base station, wherein the uplink grant allocates a distributed resource for random access of beacon transmission;
   transmitting a first beacon to other D2D UEs on a first resource block (RB), wherein the first RB is randomly selected from the distributed resource during a first beacon period; and
   continue transmitting beacons to other UEs during subsequent beacon periods, wherein each beacon is sent on a randomly selected RB from the distributed resource in each beacon period.

9. The method of claim 8, wherein the distributed resource contains k resource blocks (RBs) in every t time slots, and wherein k and t are positive integers.

10. The method of claim 9, wherein the k RBs are allocated using a predefined frequency hopping scheme to achieve frequency diversity.

11. The method of claim 8, wherein the distributed resource is semi persistently allocated on a physical uplink shared channel (PUSCH) or a physical random access channel (PRACH).

12. The method of claim 8, wherein one beacon period comprises N times t slots, and wherein N is a positive integer.

13. The method of claim 8, wherein the UE provides D2D discovery parameters via the SR, and wherein the D2D discovery parameters comprise a discovery period and a target discovery probability.

14. The method of claim 8, wherein the UE performs periodic beacon transmission over the allocated distributed resource without performing sensing.

15. The method of claim 8, wherein the UE continues transmitting beacons until the UE is stopped by a higher layer or receives a reply or reaches a maximum transmission number.

16. A user equipment (UE), comprising:
- a transmitter that transmits a device-to-device (D2D) scheduling request (SR) to a base station in a wireless communication network;
- a receiver that receives an uplink grant from the base station, wherein the uplink grant allocates distributed resource for random access of beacon transmission; and
- a discovery module that sends a plurality of beacons to other D2D UEs on a plurality of blocks (RBs), wherein each RB is randomly selected from the distributed resource during each beacon period.

17. The UE of claim 16, wherein the distributed resource contains k resource blocks (RBs) in every t time slots, and wherein k and t are positive integers.

18. The UE of claim 17, wherein the k RBs are allocated using a predefined frequency hopping scheme to achieve frequency diversity.

19. The UE of claim 16, wherein the distributed resource is semi persistently allocated on a physical uplink shared channel (PUSCH) or a physical random access channel (PRACH).

20. The UE of claim 16, wherein one beacon period comprising N times t slots, and wherein N is a positive integer.

21. The UE of claim 16, wherein the UE provides D2D discovery parameters via the SR, and wherein the D2D discovery parameters comprise a discovery period and a target discovery probability.

22. The UE of claim 16, wherein the UE performs periodic beacon transmission over the allocated distributed resource without performing sensing.

23. The UE of claim 16, wherein the UE continues transmitting beacons until the UE is stopped by a higher layer or receives a reply or reaches a maximum transmission number.

* * * * *